United States Patent
Bellinger

(10) Patent No.: US 6,508,739 B1
(45) Date of Patent: Jan. 21, 2003

(54) SYSTEM FOR PROTECTING DRIVE LINE COMPONENTS FROM EXCESSIVE ENGINE INERTIAL FORCES

(75) Inventor: Steven M. Bellinger, Columbus, IN (US)

(73) Assignee: Cummins, Inc., Columbus, IN (US)

(*) Notice: Subject to any disclaimer, the term of this patent is extended or adjusted under 35 U.S.C. 154(b) by 60 days.

(21) Appl. No.: 09/633,985

(22) Filed: Aug. 8, 2000

Related U.S. Application Data

(63) Continuation-in-part of application No. 09/191,674, filed on Nov. 13, 1998, now Pat. No. 6,186,925.

(51) Int. Cl.$^7$ .............................................. F16H 61/14
(52) U.S. Cl. ..................... 477/62; 477/168; 477/177
(58) Field of Search ............................. 477/57, 62, 63, 477/64, 168, 177, 904; 192/3.3, 3.31

(56) References Cited

U.S. PATENT DOCUMENTS

| | | | |
|---|---|---|---|
| 3,805,640 A | * | 4/1974 | Schneider et al. ............ 477/57 |
| 4,200,175 A | | 4/1980 | Dick |
| 4,289,222 A | | 9/1981 | Esthimer |
| 4,343,387 A | | 8/1982 | Hofbauer |
| 4,662,492 A | | 5/1987 | Troeder |
| 4,667,787 A | | 5/1987 | Hofmann |
| 4,674,609 A | | 6/1987 | Sturges et al. |
| 4,722,426 A | | 2/1988 | Bellanger |
| 4,722,429 A | | 2/1988 | Kono |
| 4,760,761 A | * | 8/1988 | Nishikawa et al. ........... 477/62 |
| 4,799,160 A | | 1/1989 | Arbeille et al. .......... 364/424.1 |
| 4,834,226 A | | 5/1989 | Ohkumo et al. |
| 5,190,130 A | | 3/1993 | Thomas et al. .......... 192/0.032 |
| 5,265,017 A | * | 11/1993 | Kaya et al. .................. 477/177 |
| 5,277,286 A | | 1/1994 | Yamamoto et al. |
| 5,360,381 A | | 11/1994 | Swist ........................ 477/175 |
| 5,378,211 A | | 1/1995 | Slicker et al. ............... 477/175 |
| 5,380,257 A | | 1/1995 | Coffman et al. ............. 477/175 |
| 5,439,428 A | | 8/1995 | Slicker ........................ 477/175 |
| 5,489,012 A | | 2/1996 | Buckley et al. ............. 192/3.63 |
| 5,649,880 A | | 7/1997 | Tsutsui et al. ............... 477/125 |
| 5,667,458 A | * | 9/1997 | Narita et al. ................... 477/62 |
| 5,679,098 A | | 10/1997 | Shepherd et al. ........... 477/166 |
| 5,735,770 A | | 4/1998 | Omote et al. .................. 477/5 |
| 5,738,606 A | | 4/1998 | Bellinger .................... 477/111 |
| 5,751,579 A | | 5/1998 | Hrovat et al. |
| 5,776,028 A | | 7/1998 | Matsuda et al. ............... 477/45 |
| 5,782,710 A | | 7/1998 | Kosik et al. ................... 477/86 |
| 6,161,427 A | * | 12/2000 | Watanabe et al. .......... 73/117.3 |
| 6,183,391 B1 | * | 2/2001 | Iijima .......................... 477/62 |

* cited by examiner

Primary Examiner—Sherry Estremsky
(74) Attorney, Agent, or Firm—Barnes & Thornburg

(57) ABSTRACT

A system for protecting one or more drive line components from excessive inertial torque includes a torque converter disposed between an internal combustion engine and a transmission coupled thereto, wherein the torque converter is responsive to computer control to operate in a lockup mode to directly couple the engine output shaft to the transmission input shaft and otherwise in a torque converter mode. Under conditions wherein drive line acceleration exceeds an acceleration threshold, wherein the acceleration threshold preferably corresponds to the weakest of the drive line components, a control computer is operable to force the torque converter to operate in a torque converter mode of operation to thereby electronically disengage direct connection between the engine and the transmission and then to modify fueling to thereby protect the various drive line components from damage due to excessive engine inertial torque. In an alternate embodiment, a control computer is operable to compute or otherwise estimate engine output torque and control the torque converter as just described if/when the estimated engine output torque exceeds a torque threshold corresponding to an input torque capacity of one or more of the drivetrain components.

31 Claims, 5 Drawing Sheets

SYSTEM FOR PROTECTING DRIVE LINE COMPONENTS FROM EXCESSIVE ENGINE INERTIAL FORCES

CROSS-REFERENCE TO RELATED U.S. PATENT APPLICATION

This application is a continuation-in-part of application Ser. No. 09/191,674 filed Nov. 13, 1998, now U.S. Pat. No. 6,186,925, entitled SYSTEM FOR PROTECTING DRIVE TRAIN COMPONENTS FROM EXCESSIVE ENGINE INERTIAL FORCES.

FIELD OF THE INVENTION

The present invention relates generally to electronic control systems for managing the operation of an internal combustion engine and other drive line components, and more specifically to systems for controlling such components so as to protect one or more drive line components from excessive engine inertial forces.

BACKGROUND OF THE INVENTION

Systems for controlling output torque of an internal combustion engine are known and one such system is described in U.S. Pat. No. 5,738,606 to Bellinger which is assigned to the assignee of the present invention, and the contents of which are incorporated herein by reference. One aspect of the Bellinger system is directed to control strategies for limiting engine output torque to the lowest value of the maximum input torque capacities of any of a number of drive train or drive line components. As a result, engine output torque is limited to the maximum input torque capacity of the weakest of the drivetrain components, thereby protecting all drivetrain components from excessive forces resulting from applied engine output torque.

Under certain vehicle operating conditions, the engine may also possesses substantial engine inertial torque which, if not properly accounted for, may also exceed the maximum input torque capacities of one or more of the drivetrain components. Thus, while systems such as that described in the '606 Bellinger reference may protect drivetrain components from excessive applied engine torque, no systems are known to exist that employ control strategies for protecting one or more of the drivetrain components from excessive engine inertial torque.

As an example of one vehicle operating condition wherein excessive engine inertial torque may damage drivetrain components, consider a tractor-trailer combination backing up to a loading dock in a low gear. If the vehicle operator errs and runs the back of the trailer into the dock, the wheels (as well as the various drivetrain components such as one or more transmissions, tailshaft, drive axle, clutch, etc.) stop rotating, yet the engine still possesses inertia. These rotational inertial forces possessed by the engine are accordingly transferred from the engine output drive shaft directly to the now locked drivetrain. These inertial forces may be substantial and could exceed the maximum input torque capacities of any one or more of the drivetrain components, thus resulting in excessive wear and/or drivetrain damage.

What is therefore needed is a system for protecting drivetrain components from excessive engine inertial torque. Such a system should ideally be operable to determine conditions wherein engine inertial torque is applied to the drivetrain, and implement a control strategy whereby the one or more drivetrain components are protected under conditions wherein the engine inertial torque may be excessive.

SUMMARY OF THE INVENTION

The foregoing shortcomings of the prior art are addressed by the present invention. In accordance with one aspect of the present invention, a system for protecting one or more drive line components from excessive engine inertial forces comprises a drive line including an internal combustion engine coupled by a torque converter to a number of additional drive line components, wherein the torque converter is operable in a lockup mode to couple the engine directly to the number of additional drive line components and otherwise operable in a torque converter mode, means for determining a drive line operating parameter and producing a drive line parameter value corresponding thereto, means for comparing the drive line parameter value with at least one drive line parameter threshold corresponding to a maximum input torque capacity of one of the number of additional drive train components, and means for forcing the torque converter to operate in the torque converter mode if the drive line parameter value is less than the at least one drive line parameter threshold.

In accordance with another aspect of the present invention, a method of protecting one or more of the number of additional drive train components from excessive engine inertial forces in a drive line including an internal combustion engine coupled by a torque converter to a number of additional drive line components, wherein the torque converter is operable in a lockup mode to couple the engine directly to the number of additional drive line components and otherwise operable in a torque converter mode, comprises the steps of determining a first drive line operating parameter, comparing the first drive line operating parameter with at least one drive line parameter threshold, and forcing the torque converter to operate in the torque converter mode if the first drive line operating parameter is less the at least one drive line parameter threshold.

In accordance with yet another aspect of the present invention, a method of protecting one or more of the number of additional drive train components from excessive engine inertial forces in a drive line including an internal combustion engine coupled by a torque converter to a number of additional drive line components, wherein the torque converter is operable in a lockup mode to couple the engine directly to the number of additional drive line components and otherwise operable in a torque converter mode, comprises the steps of determining a first drive line operating parameter, comparing the first drive line operating parameter with at least one drive line parameter threshold, and modifying engine fueling if the torque converter is operating in the torque converter mode and the first drive line operating parameter is beyond the at least one drive line parameter threshold to bring the first drive line operating parameter within the at least one drive line parameter threshold.

One object of the present invention is to provide a system for protecting drive line components from excessive engine inertial forces.

Another object of the present invention is to provide such a system wherein the drive line includes a torque converter disposed between an internal combustion engine and a number of downstream drive line components.

Yet another object of the present invention is to provide such a system wherein the torque converter is forced into a torque converter mode of operation, and/or to modify engine fueling if in torque converter mode, whenever drive line acceleration exceeds an acceleration threshold corresponding to a maximum acceleration threshold of one of the downstream drive line components.

Still another object of the present invention is to provide such a system wherein the torque converter is forced into a torque converter mode of operation, and/or to modify engine fueling if in torque converter mode, whenever an estimated engine output torque exceeds a torque threshold corresponding to a maximum torque capacity threshold of one of the downstream drive line components.

These and other objects of the present invention will become more apparent from the following description of the preferred embodiments.

DESCRIPTION OF THE PREFERRED EMBODIMENTS

Figure 1:
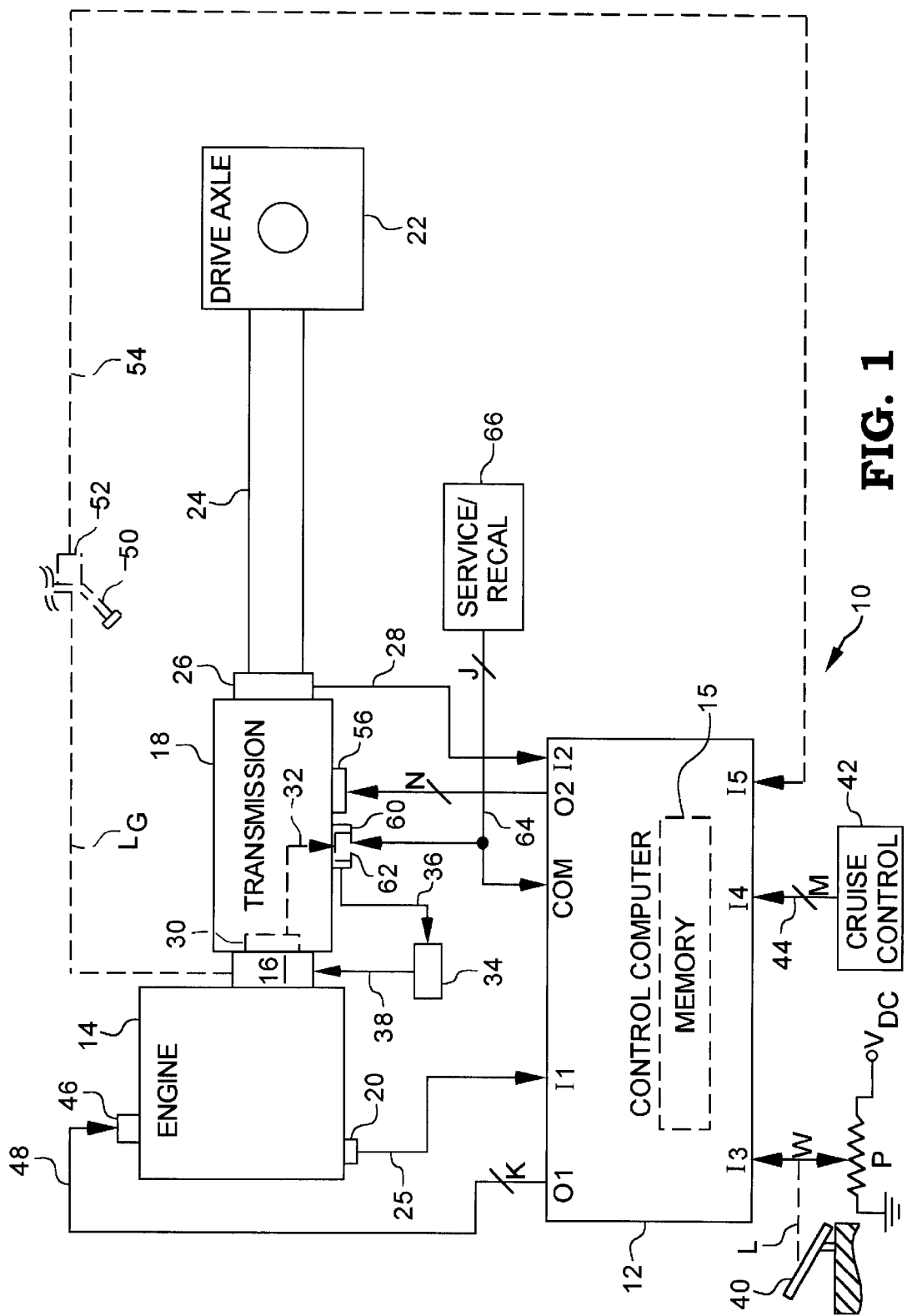
FIG. 1 is a diagrammatic illustration of a system for protecting drive train components from excessive engine inertial forces, in accordance with the present invention.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring to FIG. 1, a system 10 for protecting drive train components from excessive engine inertial forces, in accordance with the present invention, is shown. Central to system 10 is a known control computer 12 operable to control and manage the overall operation of an internal combustion engine 14. Control computer 12 is preferably microprocessor-based and includes a memory portion 15.

Engine 14 forms part of a vehicle drivetrain that further includes a clutch 16 connected thereto, wherein clutch 16 is operatively connected to a transmission 18 as is known in the art. In one embodiment of system 10, transmission 18 is a known fully automatic transmission having a number of automatically selectable gear ratios. In this embodiment, clutch 16 is a known automated clutch responsive to automatic actuation thereof, preferably under the direction of a transmission control computer, to engage/disengage engine 14 from transmission 18 as will be more fully described hereinafter. Alternatively, transmission 18 may be a known automated manual transmission having a number of manually selectable gear ratios and a number of automatically selectable gear ratios. In this embodiment, clutch 16 is responsive to manual actuation thereof to engage/disengage engine 14 from transmission 18 under vehicle launch conditions, as is known in the art. In this case, system 10 further includes a clutch pedal 50 that is mechanically coupled to clutch 16 via linkage $L_G$, wherein clutch pedal 50 may be manually actuated to thereby engage/disengage engine 14 with/from transmission 18 as is known in the art. A clutch pedal position sensor 52 is electrically connected to input INS of control computer 12 via signal path 54, wherein sensor 52 is operable to provide a clutch status signal on signal path indicative of the position of clutch pedal 50, e.g. clutch engaged or clutch disengaged. In operation, clutch pedal 50 is used to manually actuate clutch 16 to thereby engage/disengage engine 14 with/from transmission 18 typically only under vehicle launch conditions, and clutch 16 is typically neither manually nor automatically actuated for subsequent automatic shifts. Instead, a transmission control computer is operable to conduct automatic shifts near synchronous speed (i.e. engine speed synchronous with tailshaft speed) so that clutch operation is not necessary. In another alternate embodiment of system 10, transmission 18 is a known semi-automated manual transmission having a number of manually selectable gear ratios and a number of automatically selectable gear ratios. In this embodiment, clutch 16 is manually actuated via clutch pedal 50 to thereby engage/disengage engine 14 with/from transmission 18 during manual gear change operations as is known in the art. During automatic gear change operations, clutch 16 is responsive to computer generated commands to disengage/engage engine 14 with/from transmission. 18 as is known in the art. Alternatively, clutch 16 may not be actuated via computer control during automatic shifting sequences, the computer instead conducting automatic shifts near synchronous speed so that clutch operation is not necessary. In this embodiment, system 10 may also include a gear change actuation unit 56 that is electrically connected to an output O2 of control computer 12 via a number N of signal paths 58, wherein N may be any integer. One example of a transmission 18 of this type is a known "Top-2"-type transmission having a number numerically lower gears that are manually selectable and two numerically higher gears (i.e. top two gears) that are automatically selectable. In this example, gear change actuation unit 56 includes two gear change solenoids, wherein control computer 12 is operable to control automatic gear selection in the top two gears via control of the gear change solenoids. In still another alternative embodiment of system transmission 18 may be a known manual transmission having a number of manually selectable gear ratios. In this embodiment, clutch 16 is manually actuated via clutch pedal 50 to engage/disengage engine 14 with/from transmission 18 as is known in the art.

Regardless of the particular embodiment of transmission 18, clutch 16 must be automatically actuatable, preferably under computer control, in accordance with the present invention. Further details of clutch 16 relating to automatic actuation thereof will be described in greater detail hereinafter. Clutch 16 may further be manually actuatable, via clutch pedal 50, depending upon the particular embodiment of transmission 18 as described hereinabove. In any case, transmission 18 is coupled to a drive axle 22 via a propeller shaft, or tailshaft, 24, wherein driving force provided by engine 14 is transferred to the vehicle wheels (not shown) connected to drive axle 22 via transmission 18 and tailshaft 24 as is known in the art. As it relates to the present invention, the vehicle drivetrain thus includes engine 14, clutch 16, transmission 18, tailshaft 24 and drive axle 22. Those skilled in the art will recognize, however, that the vehicle drivetrain may further include one or more auxiliary transmissions and associated drive shafts, power take off (PTO) devices, and/or other known drivetrain components, and that the concepts of the present invention are applicable to any vehicle drivetrain configuration including one or more of the foregoing components.

A number of sensors, actuators and other electronic systems permit control computer 12 to interface with some of the various components of the vehicle drivetrain as well as other vehicle and engine systems. For example, engine 14 includes an engine speed sensor 20 electrically connected to input I1 of control computer 12 via signal path 25. In one embodiment, engine speed sensor 20 is a Hall effect sensor operable to sense speed and/or position of a toothed gear or tone wheel rotating synchronously with the engine crank shaft (not shown). However, the present invention contemplates that sensor 20 may be any known sensor, such as a variable reluctance sensor, operable to sense engine rotational speed and provide an engine speed signal corresponding thereto to control computer 12.

A vehicle speed sensor 26 is preferably disposed about tailshaft 24 adjacent transmission 18 and is electrically connected to input I2 of control computer 12 via signal path 28. In one embodiment, vehicle speed sensor 26 is a variable reluctance sensor operable to sense tailshaft rotational speed and provide a vehicle speed signal corresponding thereto to control computer 12. However, the present invention contemplates that vehicle speed sensor 26 may alternatively be any known sensor suitably located to determine vehicle speed and provide a vehicle speed signal corresponding thereto.

System 10 further includes an accelerator pedal 40 including an accelerator pedal position or percentage sensor electrically connected to input I4 of control computer 12. In one embodiment, the accelerator pedal position or percentage sensor includes a potentiometer P having one end electrically connected to a suitable potential $V_{DC}$ and an opposite end electrically connected to ground potential. A wiper W of the potentiometer is mechanically coupled to the accelerator pedal 40 via linkage L and is electrically connected to input I4 of control computer 12. The voltage on wiper W defines an accelerator pedal position signal that is proportional to the position or percentage of accelerator pedal 40. It is to be understood, however, that the accelerator pedal position or percentage sensor may alternatively be any known sensor operable to sense accelerator position or percentage, or pressure applied to accelerator pedal 40, and provide control computer 12 with an accelerator pedal position or percentage signal corresponding thereto.

System 10 further includes a known cruise control unit 42 connected to an input port I4 of control computer 12 via a number M of signal paths 44, wherein M may be any integer. Cruise control unit 42 typically includes manually actuatable selectors (not shown) for enabling/disabling operation of unit 42 and for selecting known set/coast and accelerate/resume features thereof. Below a specified vehicle speed, cruise control unit 26 further preferably operates in a known power take off (PTO) mode, wherein cruise control unit 42 is operable to maintain a desired engine speed.

Engine 14 further includes a known fueling system 46 electrically connected to an output O1 of control computer 12 via a number K of signal paths 48, wherein K may be any integer. In operation, control computer 12 is responsive to at least the engine speed signal on signal path 25, the vehicle speed signal on signal path 28 and one or more torque request signals to determine fueling commands and produce corresponding fueling signals on signal paths 48. Fuel system 46 is in turn responsive to the fueling signals produced by control computer 12 to supply fuel to the engine 14, as is known in the art. The one or more torque request signals may be provided by accelerator pedal sensor P or cruise control unit 42. Torque requests or torque limiting requests may further be provided by other control systems external to control computer 12 and/or one or more algorithms executable by control computer 12, wherein control computer 12 may be responsive to such torque requests or torque limiting requests in addition to a torque request signal produced by sensor P or unit 42 to produce appropriate fueling commands.

Transmission 18 preferably includes a transmission control module 60 operable to control and manage the overall operation of transmission 18. Module 60 includes a transmission control computer 62 that is preferably microprocessor-based and includes sufficient memory for storing software algorithms, calibration information, and the like. Transmission control computer 62 is connected to a communications port COM of control computer 12 via a number J of signal paths 64, wherein J may be any integer. In one embodiment, signal paths 64 comprise an SAE J1939 datalink whereby control computer 12 and transmission control computer 62 may share information. It is to be understood, however, that signal paths 64 may by any known communication path whereby information collected and managed by control computer 12 is made available to transmission control computer 62, and information collected and managed by transmission control computer 62 is likewise available to control computer 12.

In the embodiment shown in FIG. 1, a service/recalibration tool 66 of known construction is connectable to control computer 12 and/or transmission control computer 62, wherein tool 66 may be used to extract data from either computer or load programming, calibration and/or other data into either computer as is known in the art. Alternatively, service/recalibration tool 66 may be configured to interface only with control computer 12 via a suitable communications link (not shown) such as an SAE J1708 datalink configured for communications pursuant to an SAE J1587 communications protocol.

Also in the embodiment shown in FIG. 1, transmission 18 may include a transmission input speed sensor 30 electrically connected to transmission control computer 62 via signal path 32 (shown in phantom) and operable to provide transmission control computer 62 with a transmission input speed signal corresponding to rotational speed of an input shaft (not shown) of transmission 18. In one embodiment, sensor 30 is a variable reluctance sensor operable to sense rotational speed of a transmission input shaft (not shown) and provide a signal corresponding thereto to computer 62. However, the present invention contemplates that sensor 30 may alternatively be any known sensor suitably located to determine the rotational speed of a transmission input shaft and provide a shaft rotational speed signal corresponding thereto. Transmission control computer 62 may use the transmission input speed signal in place of an engine speed signal provided thereto by control computer 12 via datalink 64 to compute drive line acceleration as will be described more fully hereinafter.

System 10 further includes a clutch actuator 34 electrically connected to transmission control computer 62 via signal path 36 and electrically connected to clutch 16 via signal path 38. Alternatively, signal path 36 may be electrically connected to control computer 12, wherein control computer 12 is operable to automatically control the status of clutch 16. In some embodiments of system 10, for example, transmission 18 may not include transmission control module 60 (particularly if transmission 18 is a manual transmission), in which case signal path 36 is connected to control computer 12 and wherein control computer 12 is operable to automatically control the status of clutch 16. In either case, actuator 34 is responsive to clutch control signals provided thereto to automatically actuate clutch 16 (i.e., automatically engage or disengage engine with/from transmission 18), and in one embodiment actuator 34 includes an electrically actuatable solenoid. However, the present invention contemplates the actuator 34 may be any known electronic, electromechanical, electropneumatic or electro-hydraulic device responsive to control signals provided thereto by control computer 12 to automatically actuate clutch 16.

In embodiments of transmission 18 wherein clutch 16 may be automatically actuatable via computer control of actuator 34 and also manually actuatable via clutch pedal 50 as described hereinabove, automated clutch 16 is preferably responsive to signals provided thereto by actuator 34 to disengage engine 14 from transmission 18 regardless of the status of clutch pedal 50. However, if clutch pedal 50 is manually actuated to thereby disengage engine from transmission 18, clutch 16 is preferably non-responsive to a clutch engagement signal provided thereto by actuator 34. In other words, manual disengagement of clutch 16 via clutch pedal 50 preferably overrides any operational state of actuator 34. The following table summarizes the operational status of clutch 16 in response to the status of clutch pedal 50 and the status of actuator 34 for transmission embodiments wherein clutch 16 is configured for manual and automatic actuation thereof.

| Electronic Clutch Input (actuator 34) | Manual Clutch Input (clutch pedal 50) | Operational Status of Clutch 16 |
|---|---|---|
| Disengage | Disengage | Disengaged |
| Disengage | Engage | Disengaged |
| Engage | Disengage | Disengaged |
| Engage | Engage | Engaged |

It should be understood that for embodiments of transmission 18 wherein clutch pedal 50, linkage $L_G$, sensor 52 and signal path 54 are omitted, clutch 16 is responsive solely to signals provided thereto by actuator 34 to engage/disengage engine 14 from transmission 18. In this case, the operational status of clutch 16 follows that of actuator 34.

Figure 2:
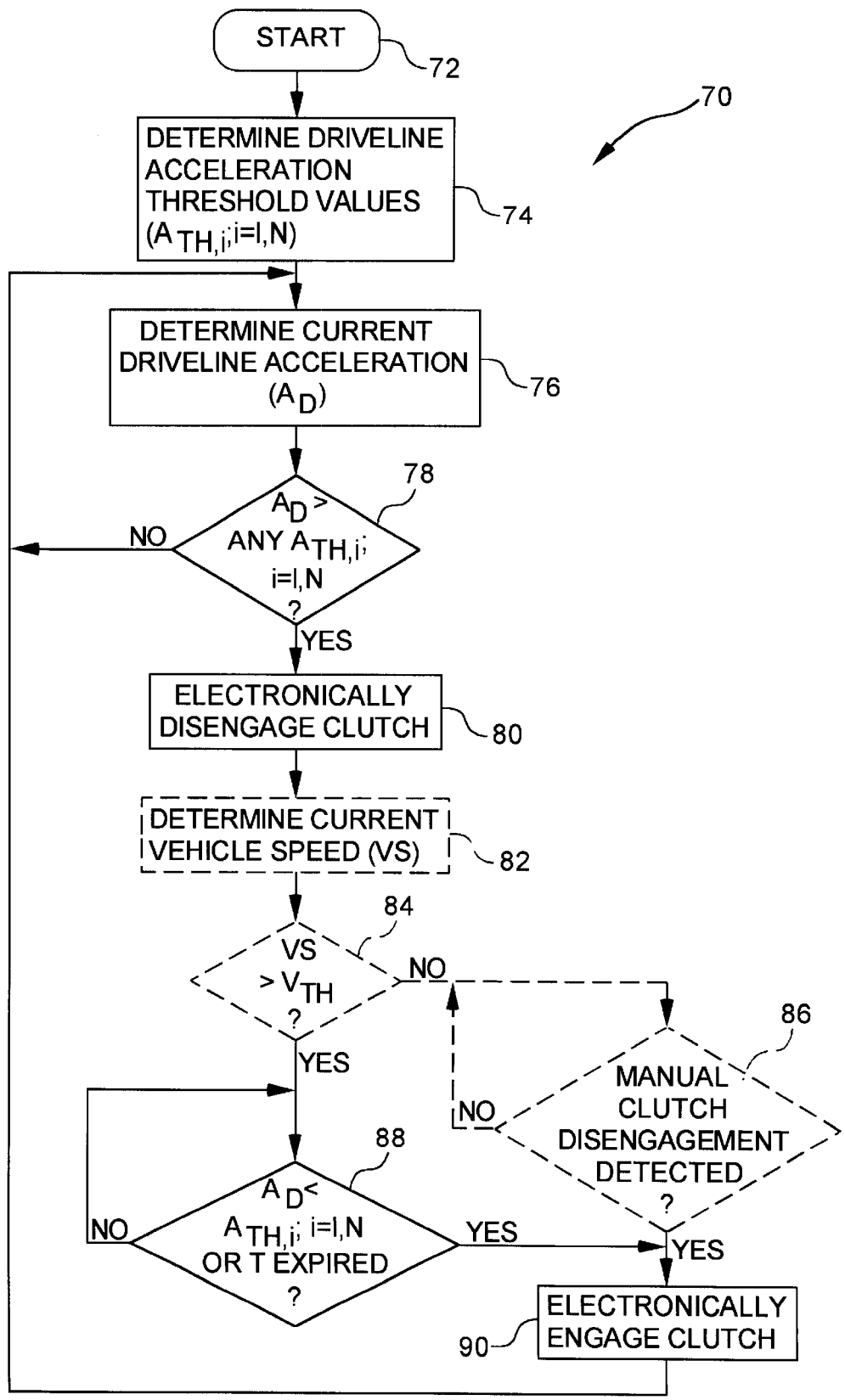
FIG. 2 is a flowchart illustrating one preferred embodiment of a software algorithm for controlling engine/vehicle operation to protect drive train components from excessive engine inertial forces in the system of FIG. 1, in accordance with the present invention.

Referring now to FIG. 2, a flowchart is shown illustrating one preferred embodiment of a software algorithm 70 for controlling engine/vehicle operation to protect drivetrain components from excessive engine inertial forces, in accordance with the present invention. Algorithm 70 is preferably stored within a memory unit (not shown) of transmission control module 60, or otherwise provided to transmission control computer 62, and is preferably executed by transmission control computer 62. It is to be understood, however, that algorithm 70 may alternatively be stored within memory 15 and executed by control computer 12. In either case, transmission control computer 62 and control computer 12 are operable to exchange any necessary information and/or commands via signal paths 64 to thereby effectuate the control strategies of algorithm 70. It is to be further understood, however, that in cases where transmission 18 does not include a transmission control module 60, algorithm 70 is executed solely by control computer 12 and control computer 12 is accordingly operable to control clutch 16 via actuator 34 according to algorithm 70. In any event, algorithm 70 will be described hereinafter as being executed by transmission control computer 62, it being understood that any or all steps of algorithm 70 may be alternatively executed by control computer 12.

Algorithm 70 begins at step 72 and at step 74., computer 62 is operable to determine one or more drive line acceleration threshold values $A_{TH,i}$, i=1, N, wherein N may be any integer. Preferably, the one or more drive line acceleration threshold values are stored within a memory unit (not shown) of transmission control module 60, but may alternatively be stored within memory 15 of control computer 12 and provided to computer 62 via signal paths 64. In either case, the one or more drive line acceleration threshold values are preferably programmable via service/recalibration tool 66. It is to be understood that the acceleration threshold values $A_{TH,i}$, i=1, N may be greater than zero, corresponding to positive acceleration, or less than zero, corresponding to negative acceleration or deceleration. In accordance with the present invention, system 10 is operable to protect drivetrain components from excessive engine inertial torque based on either excessive positive acceleration or excessive deceleration of one or more of the drivetrain components, wherein the term "acceleration" will hereinafter be understood to describe either positive acceleration or deceleration.

In one embodiment of the present invention, the clutch 16, each of the number of selectable gear ratios of transmission 18, the propeller shaft or tailshaft 24 and the drive axle 22, each have a drive line acceleration threshold value associated therewith. Computer 62 is preferably operable at step 74 to determine the drive line acceleration values for the clutch 16, tailshaft 24 and drive axle 22 by recalling these values from memory or otherwise determining these values, and is further preferably operable to determine a currently engaged gear ratio of transmission 18 and recall an acceleration threshold value from memory or otherwise determine an acceleration threshold value corresponding to the currently engaged gear ratio. Computer 62 is operable in one embodiment of step 74 to determine the currently engaged gear ratio as a ratio of engine speed and tailshaft speed, wherein both of these parameters are provided thereto by control computer 12 via signal paths 64. Alternatively, transmission control module 60 may include known means therein for determining currently engaged gear ratio directly from transmission 18. The precise manner in which the currently engaged gear ratio information is computed or obtained, however, does not form part of the present invention, and the present invention accordingly contemplates any known means or technique for determining the currently engaged gear ratio. In any case, computer 62 is thus operable in this embodiment to determine four acceleration threshold values. It is to be understood, however, that the present invention contemplates that any one or more, or only certain ones, of the drivetrain components may have an acceleration threshold value associated therewith and that one or more, or only certain ones, of the selectable gear ratios of transmission 18 and/or any auxiliary transmission included within the drivetrain may have an acceleration threshold value associated therewith. Alternatively, transmission 18 and/or any auxiliary transmission included within the vehicle drivetrain may have only a single acceleration threshold value associated therewith so that step 74 need not include a determination of the presently engaged gear ratio thereof. Alternatively still, only a single acceleration threshold value may be provided wherein the single acceleration threshold value is applicable to the entire vehicle drivetrain.

In any event, algorithm execution continues from step 74 at step 76 where computer 62 is operable to determine a current drive line acceleration value $A_D$. In one embodiment, computer 62 is operable to determine $A_D$ by processing engine speed, provided thereto by control computer 12 via signal paths 64, in accordance with well known equations. Alternatively, computer 62 may be operable at step 76 to determine $A_D$ by processing tailshaft speed, provided thereto by control computer 12 via signal paths 64, in accordance with well known equations. Alternatively still, computer 62 may be operable to determine $A_D$ by processing the speed signal provided thereto by transmission input shaft sensor 30 in accordance with well known equations. It is to be understood, however, that the present invention contemplates processing any sensor or subsystem signal indicative of rotational speed or position of any one or more drivetrain shafts in accordance with well known equations, and determining $A_D$ therefrom.

In any event, algorithm execution continues from step 76 at step 78 where computer 62 is operable to compare the current drive line acceleration value $A_D$ with the one or more drive line acceleration threshold values $A_{TH,i}$; i=1, N. If $A_D$ does not exceed any of the one or more drive line acceleration threshold values, algorithm execution loops back to step 76. If, however, computer 62 determines that $A_D$ exceeds any of the one or more drive line acceleration threshold values $A_{TH,i}$; i=1, N, algorithm execution continues at step 80 where computer 62 is operable to control actuator 34 to electronically disengage clutch 16. Thus, computer 62 is operable, in accordance with the present invention, to effectuate disengagement of engine 14 from transmission 18 in the event that the absolute value of the current drive line acceleration rate exceeds the absolute value of the smallest of the one or more drive line acceleration threshold values, corresponding to the weakest drivetrain component, thereby protecting all of the various drivetrain components from excessive engine inertial forces.

In the event that clutch 16 is manually actuatable via a clutch pedal 50 as described hereinabove, algorithm 70 preferably includes steps 82–86. At step 82, computer 62 is operable to determine a current vehicle speed, preferably provided thereto by control computer 12 via signal paths 64. Thereafter at step 84, if the current vehicle speed is greater than a vehicle speed threshold value $V_{TH}$, algorithm execution continues at step 88 where computer 62 is operable in one embodiment to continue computing $A_D$ and comparing $A_D$ with the one or more drive line acceleration threshold values. As long as $A_D$ remains in excess of all of the one or more drive line acceleration threshold values, step 88 loops back on itself. If/when $A_D$ drops below all of the one or more drive line acceleration threshold values, however, algorithm execution continues at step 90 where computer 62 is operable to control actuator 34 to thereby electronically disengage clutch 16 (i.e., disengage engine 14 from transmission 18). In an alternate embodiment of step 88, computer 62 is operable to monitor an internal timer and loop back to step 88 as long as a time value of the internal timer indicates that some programmable time period T has not expired since electronically disengaging clutch 16 at step 80. If/when the programmable time period T expires since electronically disengaging clutch 16 at step 80, computer 62 is operable to reset the internal timer and advance to step 90 to electronically disengage clutch 16.

If the current vehicle speed is less than or equal to $V_{TH}$ at step 84, algorithm execution continues at step 86 where computer 62 is operable to determine whether clutch 62 is manually disengaged, preferably via the clutch pedal sensor signal monitored by control computer 12 and provided by control computer 12 to computer 62 via signal paths 64. As long as computer 62 fails to detect manual disengagement of clutch 16, step 86 loops back on itself. If/when computer 62 detects manual disengagement of clutch 16, algorithm execution continues at step 90 where computer 62 is operable to control actuator 34 to thereby electronically engaged clutch 16.

Steps 82–86 are preferably included so that if computer 62 electronically disengages clutch 16, manual clutch disengagement of clutch 16 must occur prior to electronically engaging clutch 16 is vehicle speed is below a vehicle speed threshold value. Thus, if vehicle speed is in the range of vehicle launch speeds, steps 82–86 ensure that the vehicle operator is not taken by surprise by an unexpected electronic engagement of clutch 16 after electronic clutch engagement. Instead, computer 62 will not electronically engage clutch 16 unless/until manual clutch disengagement is detected, which is consistent with the table set forth hereinabove in the event that clutch 16 is both electronically and manually actuatable. If system 10 does not include a clutch pedal 50 or other device operable to manually actuate clutch 16, steps 82–86 may be omitted from algorithm 70, as indicated by the dashed-line representations of steps 82–86.

While the invention has been illustrated and described in detail in the foregoing drawings and description, the same is to be considered as illustrative and not restrictive in character, it being understood that only the preferred embodiments thereof has been shown and described and that all changes and modifications that come within the spirit of the invention are desired to be protected. For example, as an alternative to the acceleration thresholding technique described hereinabove with respect to algorithm 70, the present invention contemplates providing for an engine torque thresholding technique. In this embodiment, computer 62 is operable to estimate vehicle mass in accordance with one or more known techniques, or recall a programmed vehicle mass value from memory, compute drive line acceleration in accordance with any one or more of the techniques described hereinabove, and compute (or estimate) engine inertial torque from these two parameters in accordance with Newton's second law (F=ma). Computer 62 is then operable to compare the computed or estimated engine inertial torque value with one or more programmable engine inertial torque threshold values stored in memory and electronically disengage clutch 16 if/when the computed or estimated engine inertial torque exceeds one or more of the engine inertial torque threshold values stored in memory. Those skilled in the art will recognize modifications to algorithm 70 necessary to effectuate an engine inertial torque-based control technique rather than a drive line acceleration-based control technique set forth in FIG. 2, that such modifications would be mere mechanical steps to a person of ordinary skill in the computer programming art, and that such an alternative technique falls within the scope of the present invention.

Figure 3:
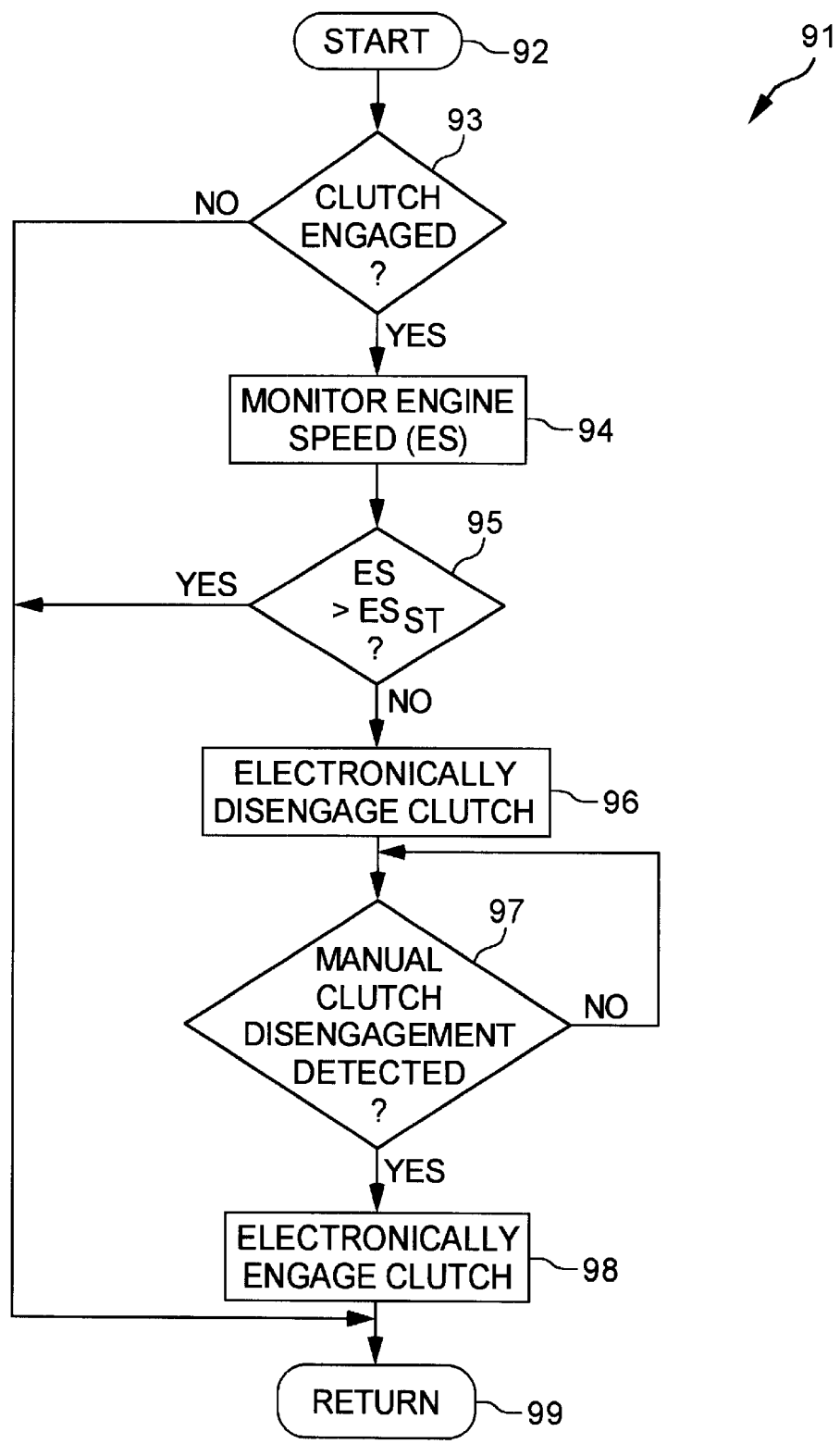
FIG. 3 is a flowchart illustrating one preferred embodiment of a software algorithm for controlling clutch operation in the system of FIG. 1 to avoid engine stalling under vehicle launch conditions, in accordance with another aspect of the present invention.

Referring now to FIG. 3, a flowchart is shown illustrating one preferred embodiment of a software algorithm 91 for electronically controlling the operation of clutch 16 to prevent the engine 14 from stalling as a result of improper manual actuation of clutch 16, in accordance with another aspect of the present invention. In this embodiment, system 10 must accordingly include a manual clutch pedal 50 or other known manual clutch actuator, and transmission 18 must therefore be a manual, automated manual or manual-automatic transmission wherein clutch 16 is actuatable via pedal 50 to engage at least one gear ratio of transmission 18. For example, if transmission 18 is a known manual or manual-automatic transmission (e.g., so-called top-2 transmission), it includes a number of manually selectable gear ratios whereby clutch 16 may be manually actuated in a known manner to engage and disengage transmission 18 to and from engine 14 during manual gear shifting operations. If, on the other hand, transmission 18 is an automated manual transmission, it typically includes a single manually selectable gear ratio whereby clutch 16 may be manually actuated in a known manner to engage and disengage transmission 18 to and from engine 14 to thereby launch the vehicle carrying engine 14. In either case, and especially during vehicle launch conditions and other numerically low gear operation, sufficient engine speed must be maintained to drive transmission 18 and thereby avoid stalling the engine. Under vehicle launch conditions in particular, excessively rapid manual engagement of clutch 16 under sufficiently low engine RPM conditions will typically cause the engine to stall as is known in the art. Likewise, if the clutch 16 is not manually disengaged when coming to a stop, the engine 14 will not have sufficient speed to drive transmission 18 and will eventually stall as a result. To combat these two problems, algorithm 91 provides a control strategy for preventing vehicle stalling through control of clutch 16. Algorithm 91 is designed to rely upon the above table defining the operational status of clutch 16 in response to the status of clutch pedal 50 and the status of actuator 34 for transmission embodiments wherein clutch 16 is configured for manual and automatic actuation thereof. Alterations to this table will accordingly require corresponding modifications to algorithm 91, although such modifications to algorithm 91 would be well within the knowledge of a skilled artisan.

Algorithm 91 may be executed via control computer 12 or alternatively via transmission control computer 62, wherein any resulting or interim information required by either computer 12 or 62 may be shared via communications link 64 as described hereinabove. Although either computer 12 or 62 may execute algorithm 91, the flowchart of FIG. 3 will be described hereinafter as being executed by control computer 62. In any case, algorithm 91 begins at step 92 and at step 93, control computer 62 is operable to determine whether clutch 60 is currently engaged. Control computer 62 is preferably operable to execute step 93 by comparing the clutch pedal signal produced by sensor 52 (and passed by control computer 12 to control computer 62 via signal path 64) with the status of the electronic clutch actuator 34 (controlled by control computer 62) with the above-described table. If, at step 93, transmission control computer 62 determines that clutch 62 is disengaged, algorithm 91 advances to step 99. If, on the other hand, control computer 62 determines at step 93 that clutch 62 is engaged (i.e., the clutch 16 is both manually and electronically engaged), algorithm execution advances to step 94 where computer 62 is operable to monitor engine speed (ES), preferably via information provided thereto by control computer 12 via signal path 64. Thereafter at step 95, control computer 62 is operable to compare engine speed (ES) with a stall engine speed ESST. In one embodiment, $ES_{ST}$ is a function of currently engaged gear ratio of the transmission, although the present invention contemplates defining $ES_{ST}$ as a constant value or as a function of one or more other engine/vehicle operating parameters. Moreover, the value or values of $ES_{ST}$ is/are preferably programmable within a memory unit associated with transmission control computer 62 via service/recalibration tool 66.

In any case, if control computer 62 determines at step 95 that ES is greater than $ES_{ST}$, then engine speed ES is sufficiently high to avoid stalling under current operating conditions and algorithm execution accordingly advances to step 99. If, on the other hand, control computer 62 determines at step 95 that ES is less than or equal to $ES_{ST}$, then engine speed ES is dangerously low for the current operating conditions, and algorithm execution accordingly advances to step 96 to electronically disengage clutch 16 in a manner described hereinabove to thereby avoid stalling the engine. Thereafter at step 97, control computer 62 is operable to determine whether manual clutch disengagement has occurred since executing step 96. Preferably, computer 62 is operable to execute step 97 by monitoring clutch pedal sensor 50 (via control computer 12). If, at step 97, control computer 62 determines that manual clutch disengagement has not occurred since executing step 96, algorithm execution loops back to step 97. If, on the other hand, control computer 62 determines at step 97 that manual clutch disengagement has occurred since executing step 96, then algorithm execution advances to step 98 where control computer 62 is operable to electronically engage clutch 16 in a manner described hereinabove. Algorithm execution advances from step 98 to step 99 where algorithm execution is returned to its calling routing. Alternatively, algorithm 91 may be configured such that step 98, as well as the "YES" branch of step 95 and the "NO" branch of step 93, loop back to step 93 for continual operation of algorithm 91. Steps 97 and 98 are preferably included within algorithm 91 to ensure that the vehicle operator has control of the clutch 16 before electronic re-engagement thereof.

Figure 4:
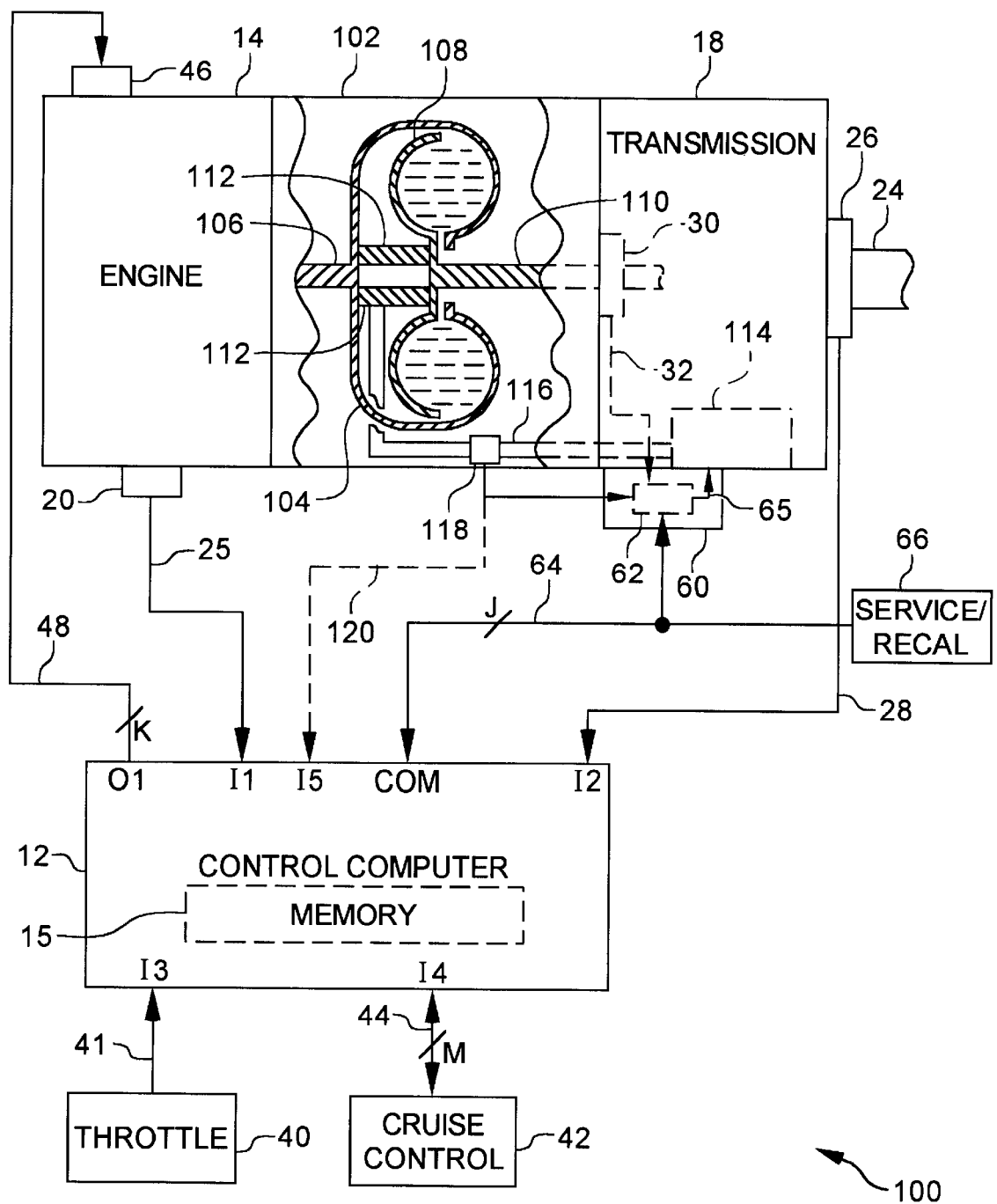
FIG. 4 is a diagrammatic illustration of another system for protecting drive train components from excessive engine inertial forces, in accordance with another aspect of the present invention.

Referring now to FIG. 4, another system 100 for protecting drive train components from excessive engine inertial forces, in accordance with another aspect of the present invention, is shown. System 100 includes a number of components identical to corresponding components in system 10 of FIG. 1, and like numbers are therefore used to identify like components. Description of such components will be omitted here for brevity, although some differences therebetween, as they relate to the embodiment illustrated in FIG. 4, will be described for clarity.

In place of the clutch 16 and related componentry of FIG. 1, the system 100 of FIG. 4 includes a torque converter 102 disposed between engine 14 and transmission 18. In this embodiment, transmission 18 includes transmission control module 60 having an auxiliary control computer 62 located therein for controlling various operational features of transmission 18 as described hereinabove, and also for controlling the operation of the torque converter 102 as will be described more fully hereinafter. Propeller shaft 24 extends from transmission 18, and should be understood to couple to a drive axle 22 as shown in FIG. 1 although the drive axle structure is omitted from FIG. 4 for brevity. As with system 10 of FIG. 1, a control computer 12, including a memory unit 15, is coupled to a fuel system 46, engine speed sensor 20, throttle 40 (shown in FIG. 4 as a functional block electrically connected to control computer 12 via signal path 41), cruise control unit 42 and service/recalibration tool 66. Control computer 12 is operable to interface with the foregoing components as described with respect to FIG. 1.

Torque converter 102 includes an impeller or pump 104 affixed to a torque converter adaptation assembly 106 that is driven by an output shaft of the engine 12, and a turbine 108 affixed to a turbine shaft 110 of transmission 18. A lockup clutch 112 is disposed between impeller 102 and turbine 108, and is fluidly coupled to a charge pump 114 of transmission 18 via fluid passageway 116. A fluid pressure sensor 118 is disposed in-line with the fluid passageway 116 and is electrically connected to an input of control computer 62 and optionally to an input I5 of control computer 12, via signal path 120. Pressure sensor 118 is operable to produce a pressure signal indicative of the fluid pressure within passageway 116, wherein control computer 62 or control computer 12 may, in some embodiments of the present invention, determine an operational status of torque converter 102 based on the fluid pressure signal.

In the typical operation of system 100, the torque converter 102 is operable in a so-called "torque converter" mode during vehicle launch and low speed operations, whereby the lockup clutch 112 is disengaged and the impeller 104 therefore rotates at the speed of the engine 12 while the turbine 108 is rotatably actuated by the impeller 104 through a fluid disposed therebetween (illustrated by dashed lines between impeller 104 and turbine 108 in FIG. 4). In this operational mode, torque multiplication occurs through the fluid coupling such that the transmission turbine shaft 110 is exposed to more input torque than is being supplied by the torque converter adaptation assembly 106, as is known in the art. When the engine 12 is otherwise engaged with certain gear ratios of transmission 18, the torque converter is generally operable in a so-called "lockup" mode, whereby the lockup clutch 112 is engaged and the impeller 104 is therefore secured to the turbine 108 to thereby directly couple the torque converter adaptation assembly 106 to the turbine shaft 110, as is known in the art.

The transmission 18 is operable, in a known manner, to electrically (and hydraulically) control the operational status of the lockup clutch 112 as is known in the art. As shown in FIG. 4, for example, a fluid passageway 116 couples the lockup clutch 112 to the charge pump 114 of transmission 18 and control computer 62 is electrically connected to charge pump 114 via signal path 65. The control computer 62 is operable to control charge pump 114 such that pump 114, in turn, controls the hydraulic pressure of fluid supplied thereto to operably engage and disengage lockup clutch 112.

Figure 5:
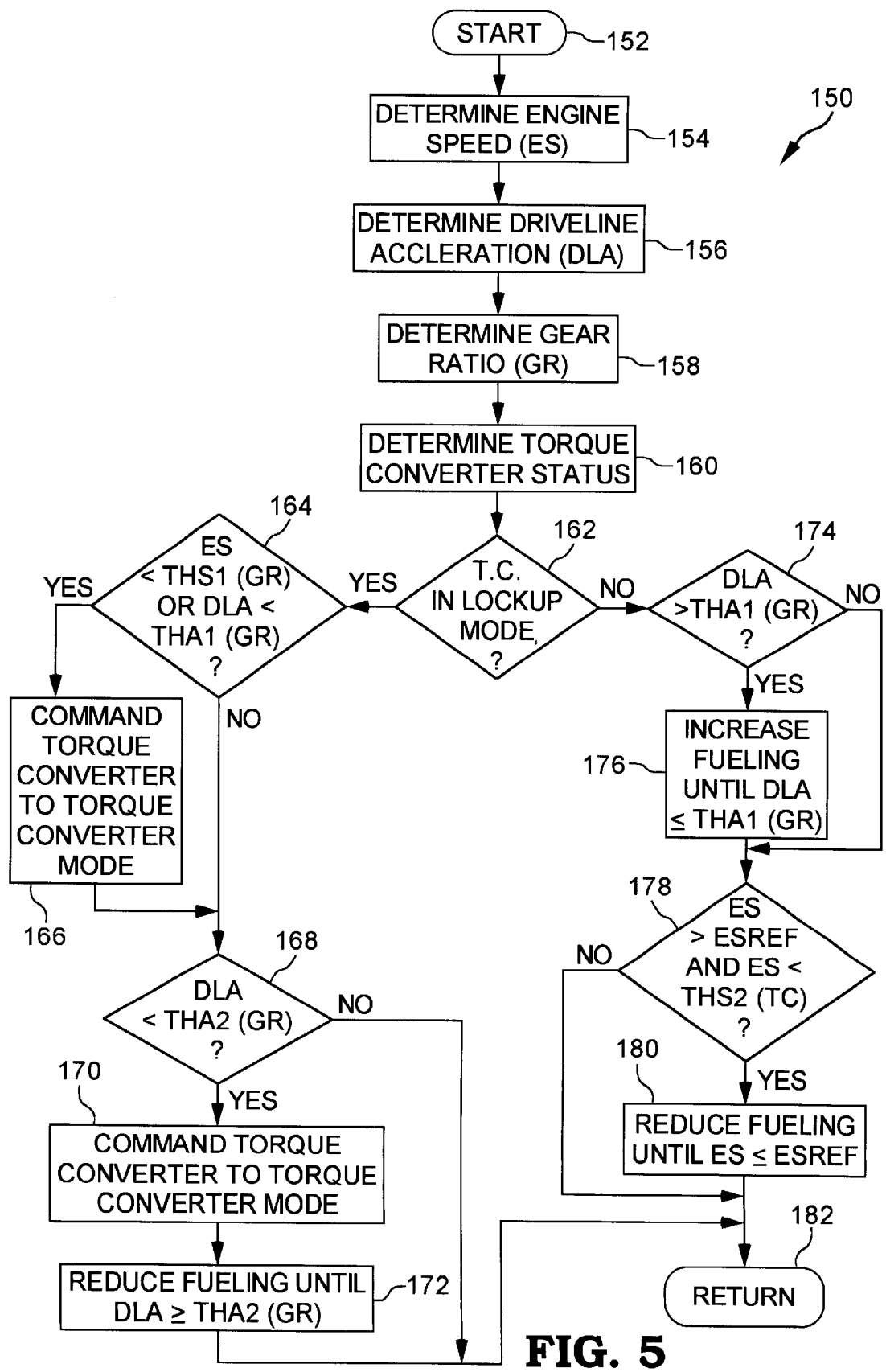
FIG. 5 is a flowchart illustrating one preferred embodiment of a software algorithm for controlling engine/vehicle operation to protect drive train components from excessive engine inertial forces in the system of FIG. 4, in accordance with the present invention.

Referring now to FIG. 5, a flowchart is shown illustrating one preferred embodiment of a software algorithm 150 for controlling engine/vehicle operation to protect drive line components from excessive engine inertial forces, in accordance with another aspect of the present invention. Algorithm 150 is preferably stored within a memory unit (not shown) of transmission control module 60, or otherwise provided to transmission control computer 62, and is preferably executed by transmission control computer 62. It is to be understood, however, that algorithm 150 may alternatively be stored within memory 15 and executed by control computer 12. In either case, transmission control computer 62 and control computer 12 are operable to exchange any necessary information and/or commands via signal paths 64 to thereby effectuate the control strategies of algorithm 150. In any event, algorithm 150 will be described hereinafter as being executed by transmission control computer 62, it being understood that any or all steps of algorithm 150 may be alternatively executed by control computer 12.

Algorithm 150 begins at step 152 and at step 154, control computer 62 is operable to determine a current engine rotational speed value ES. In one embodiment, control computer 62 is operable to determine current engine speed ES via information provided thereto by control computer 12 via signal paths 64. Alternatively, control computer 62 may be operable at step 154 to determine ES via transmission input speed sensor 30. In this embodiment, the operation of torque converter 102 may alter the rotational speed produced by engine 14, and control computer 62 is thus operable in this embodiment to determine engine speed ES as a function of transmission input speed and certain characteristics of the torque converter 102. For example, if the torque converter 102 is operating in lockup mode, the impeller 104 is coupled directly to the turbine shaft 110 so that the speed signal produced by sensor 30 is equal to the engine rotational speed ES. However, if the torque converter 102 is operating in torque converter mode, control computer 62 is preferably operable to compute, or has stored therein, an engine speed modification factor relating true engine speed to transmission input speed. Control computer 62 is then operable at step 154 to compute engine speed ES as a function of transmission input speed, produced by sensor 30, and the engine speed modification factor. The engine speed modification factor may be determined via known techniques, and such a determination would be a mechanical step for a skilled artisan.

Algorithm 154 advances from step 154 to step 156 where control computer 62 is operable to determine a drive line acceleration value (DLA). In one embodiment, control computer 62 is operable to determine drive line acceleration DLA as a function of engine speed (ES) over a desired time interval. Alternatively, control computer 62 is operable at step 156 to determine drive line acceleration DLA as a function of transmission input speed over a desired time interval, wherein transmission input speed is determined via signals produced by transmission input speed sensor 30. Alternatively still, control computer 62 may be operable to determine drive line acceleration DLA as a function of vehicle speed (VS) over a desired time interval, wherein vehicle speed information is preferably provided to control computer 62 via control computer 12 via signal paths 64 based on signals produced by vehicle speed sensor 26.

Following step 156, control computer 62 is operable at step 158 to determine a gear ratio (GR) value via any known means therefor. In one embodiment, for example, control computer 62 is operable to control automatic shift points of transmission 18 and therefore contains information relating to currently engaged gear ratio. Alternatively, control computer 62 may be operable to determine GR as a function of transmission input speed, based on signals provided thereto via sensor 30, and transmission output speed, based on information provided thereto from control computer 12 from signals produced by vehicle speed sensor 26. Alternatively still, control computer 62 may be operable to determine GR as a function of engine speed ES, based on information provided thereto from control computer 12 from signals produced by engine speed sensor 20, and of vehicle speed, based on information provided thereto from control computer 12 from signals produced by vehicle speed sensor 26. In this embodiment, control computer 62 must also take into account any effects of torque converter 102 on engine speed as described hereinabove.

Algorithm 150 advances from step 158 to step 160 where control computer 62 is operable to determine an operational status of torque converter 102. In one embodiment, control computer 62 is operable to control the operation of charge pump 114 and accordingly has knowledge of the operational status of torque converter 102. Alternatively, control computer 62 may be operable to determine the operational status of torque converter 102 based on signals produced by fluid pressure sensor 118 in accordance with well-known principles. In embodiments wherein control computer 12 is operable to execute algorithm 150, control computer 12 is preferably operable to determine the operational status of torque converter 102 via information provided thereto by control computer 62 via signal paths 64, or based on information provided thereto by fluid pressure sensor 118.

Algorithm execution advances from step 160 to step 162 where control computer 62 is operable to determine whether the torque converter 102 is in lockup mode (or alternatively in torque converter mode) based on information determined at step 160. If in lockup mode, algorithm execution advances to step 164 where control computer 62 is operable to determine whether engine speed (ES) is less than a first engine speed threshold value THS1 or whether drive line acceleration (DLA) is less than a first drive line acceleration threshold value THA1. Since the inertial torque capacities of the various drive line components are generally a function of presently engaged gear ratio, threshold values THS1 and THA1 are likewise preferably a function of gear ratio (GR). Moreover, control computer 62 is preferably operable at step 164 to determine THA1 as a minimum one of any number of acceleration threshold values corresponding to any of a number of drive line components as described with respect to the embodiment of FIGS. 1 and 2. For example, any one or more of the drive line components may have an acceleration threshold value associated therewith, wherein any particular acceleration threshold value corresponds to an acceleration threshold at which, or below which, that component achieves its maximum input torque capacity, and control computer 62 is operable at step 164 to determine THA1 as a minimum of the various acceleration threshold values (corresponding to the weakest of the drive line components). In any case, if control computer 62 determines at step 164 that ES<THS1 or that DLA<THA1, algorithm execution advances to step 166 where control computer 62 is operable to command the torque converter 102 to torque converter mode of operation, thereby removing the direct coupling between impeller 104 and the transmission input shaft 110. This allows any excess engine inertial torque to be absorbed by the fluid disposed between the impeller 104 and turbine 108. Control computer 62 is preferably operable at step 166 to control the operational mode of torque converter 102 via appropriate control of the charge pump 114 as described hereinabove.

Algorithm execution continues from step 166, or from the "NO" branch of step 164, to step 168 where control computer 62 is operable to determine whether drive line acceleration (DLA) is less than a second drive line acceleration value THA2, wherein THA2 is preferably a function of gear ratio (GR) as described hereinabove. Moreover, control computer 62 is preferably operable at step 164 to determine THA2 as an absolute minimum one of any of a number of acceleration threshold values corresponding to any of a number of drive line components as described with respect to the embodiment of FIGS. 1 and 2. For example, any one or more of the drive line components may have an acceleration threshold value associated therewith, wherein any particular acceleration threshold value corresponds to an acceleration threshold at which, or below which, that component achieves its maximum input torque capacity, and control computer 62 is operable at step 168 to determine THA2 as an absolute minimum of the various acceleration threshold values (corresponding to the weakest of the drive line components). In any case, THA2 is preferably a negative acceleration, or deceleration threshold value, whereby control computer 62 is operable at step 168 to determine whether drive line deceleration, in this case, is less than (more negative than) THA2. If so, algorithm execution advances to step 170 where control computer 62 is operable to command torque converter 102 to torque converter operational mode in accordance with known techniques. Thereafter at step 172, control computer 62 is operable to reduce fueling until drive line acceleration (drive line deceleration in this case) rises above THA2. Preferably, control computer 62 is operable to execute step 172 by broadcasting an appropriate message to control computer 12 via signal paths 64. Control computer 12 is, in this embodiment, responsive to such a message to reduce fueling to engine 14. Control computer 12 may be operable at step 172 to reduce fueling by immediately cutting fuel to zero, or by ramping fueling down at any desired rate including a rate defined as a function of a difference between DLA and THA2. In any case, algorithm execution advances from step 172, as well as from step the "NO" branch of step 168, to step 182 where algorithm execution is returned to its calling routine.

If, at step 162, control computer 62 determines that the torque converter 102 is operating in torque converter mode, algorithm execution advances to step 174 where control computer 62 is operable to determine whether drive line acceleration (DLA) is greater than THA1. If so, control computer 62 is operable to increase fueling until DLA decreases to less than or equal to THA1. Preferably, control computer 62 is operable to increase fuel in a similar manner to that of fuel reduction step 172, wherein control computer 12 may be operable at step 176 to increase fueling at any desired rate including a rate defined as a function of a difference between DLA and THA1.

Algorithm execution advances from step 176, as well as from the "NO" branch of step 174, to step 178 where control computer 62 is operable to determine whether engine speed ES is greater than a reference engine speed ESREF but below a second engine speed threshold THS2, wherein THS2 is preferably a function of any torque converter effects on engine speed (since torque converter 102 is operating in torque converter mode at step 178). If, at step 178, control computer 62 determines that ES>ESREF and ES<THS2, algorithm execution advances to step 180 where control computer 62 is operable to reduce fueling, preferably in the same manner as step 172, until ES is less than or equal to ESREF. Algorithm execution advances from step 180, as well as from the "NO" branch of step 178, to step 182 where algorithm execution is returned to its calling routine.

In an alternate embodiment of algorithm 150, computer 62 is operable to modify step 156 to estimate engine output torque or force (F) as a function of estimated vehicle mass (m) and drive line acceleration (a) (i.e., according to the equation F=ma), and to replace the acceleration threshold values THA1 and THA2 with corresponding torque thresholds THT1 and THT2 (preferably as functions of gear ratio as described with respect to THA1 and THA2), wherein the torque thresholds THT1 and THT2 correspond to torque capacities of the various drive line components. In this alternate embodiment, computer 62 is thus operable to replace the acceleration thresholding technique illustrated in FIG. 5 with a torque thresholding technique based on estimated engine output torque as compared with one or more torque capacity thresholds. Those skilled in the art will recognize minor modifications required to algorithm 150 to effectuate this alternate technique, and that such modifications would be a mechanical step to a skilled artisan. In either embodiment of algorithm 150, all speed, torque and acceleration thresholds are preferably stored in memory and may be established or modified therein via service/recalibration tool 66 as described hereinabove.

Algorithm 150 was designed to protect various drive line components from excessive engine inertial torque in at least three specific scenarios. According to a first scenario, for example, a vehicle carrying system 100 is traveling on ice or other slippery surface with torque converter 102 in lockup mode when the operator depresses the service brakes and locks up the wheels such that engine speed drops sharply and the drive line speed drops instantaneously to zero, and then the driving surface transitions to a dry or otherwise rough surface. In this case, THS1 and THA1 are preferably chosen such that step 164 advances to step 166 to command torque converter mode when engine speed and/or drive line acceleration drops sharply due to locking up of the wheels. Thereafter, when the driving surface changes instantaneously to a dry or other rough surface with the torque converter 102 operating in torque converter mode, the rate of fueling increase at step 176 is chosen such that DLA drops to less than or equal to THA1 as quickly as possible. This first scenario is therefore addressed by steps 154–166 as well as steps 174–176 of algorithm 150.

According to a second scenario, for example, a vehicle carrying system 100 is traveling on ice or other slippery surface with torque converter 102 in lockup mode when the operator rapidly increases fueling such that the wheels spin, and then the driving surface transitions to a dry or otherwise rough surface such that the drive line acceleration (DLA) goes negative (i.e., drive line deceleration occurs). In this case, THA2 is preferably chosen such that step 168 advances to steps 170 and 172 to command torque converter mode and reduce fueling when drive line deceleration increases due to the change in driving surface to a dry or otherwise rough surface. The rate of fueling decrease at step 172 is likewise chosen such that DLA increase to greater than or equal to THA2 as quickly as possible. This first scenario is addressed by steps 154–162 and steps 168–172 of algorithm 150.

According to a third scenario, a vehicle carrying system 100 is backing up to a loading dock or other structure with torque converter 102 in torque converter mode when the vehicle strikes the structure such that engine speed increases sharply and drive line speed drops sharply to zero. In this case, ESREF and THS2 are preferably chosen such that step 178 advances to steps 180 to reduce fueling when drive line speed (determined in this case by engine speed as a function of torque converter effects TC on engine speed) drops sharply and engine speed increases sharply. The rate of fueling decrease at step 178 is chosen such that engine speed decreases to less than or equal to ESREF as quickly as possible. This third scenario is addressed by steps 154–162 and steps 178–180 of algorithm 150.

Those skilled in the art will recognize other engine/vehicle operating scenarios wherein it is desirable to command torque converter 102 from lockup to torque converter operational mode and/or to modify fueling when torque converter 102 is operating in torque converter mode, to thereby protect drive line components from excessive engine inertial torque. Such other scenarios are intended to fall within the scope of the present invention.

What is claimed is:

1. A system for protecting one or more drive line components from excessive engine inertial forces, comprising:
    a drive line including an internal combustion engine coupled by a torque converter to a number of additional drive line components, said torque converter operable in a lockup mode to couple said engine directly to said number of additional drive line components and otherwise operable in a torque converter mode;
    means for determining a drive line operating parameter and producing a drive line parameter value corresponding thereto;
    means for comparing said drive line parameter value with at least one drive line parameter threshold corresponding to a maximum input torque capacity of one of said number of additional drive train components; and
    means for forcing said torque converter to operate in said torque converter mode if said drive line parameter value is less than said at least one drive line parameter threshold.

2. The system of claim 1 further including a memory unit having said at least one drive line parameter threshold stored therein.

3. The system of claim 2 wherein said memory unit includes a number of drive line parameter thresholds stored therein, each of said number of drive line thresholds corresponding to a maximum input torque capacity of a separate one of said number of additional drive line components;
    and wherein said means for comparing includes means for comparing said drive line parameter value with each of said number of drive line parameter thresholds;
    and wherein said means for forcing includes means for forcing said torque converter to operate in said torque converter mode if said drive line parameter value exceeds any one of said number of drive line parameter thresholds.

4. The system of claim 1 wherein said drive line parameter value is drive line acceleration;
    and wherein said at least one drive line parameter threshold is a drive line acceleration threshold.

5. The system of claim 1 wherein said drive line parameter value is an estimated engine output torque;
    and wherein said at least one drive line parameter threshold is a torque capacity threshold.

6. The system of claim 1 further including a first control computer operable to control and manage operation of said internal combustion engine, said first control computer including said means for determining and said means for comparing.

7. The system of claim 6 further including:
    a second control computer associated with one of said additional drive line components, said second control computer including said means for forcing; and
    a communications link connected between said first and second control computers, said first and second control computers communicating information over said communications link.

8. The system of claim 1 further including a first control computer associated with one of said additional drive line components, said first control computer including said means for determining, said means for comparing and said means for forcing.

9. The system of claim 1 further including means for modifying engine fueling if said torque converter is operating in said torque converter mode and said drive line parameter value is beyond said at least one drive line parameter threshold to bring said drive line parameter value within said at least one drive line parameter threshold.

10. The system of claim 1 further including:
    a memory having said at least one drive line parameter threshold stored therein; and
    a service/recalibration tool configured for communication with said memory, said at least one drive line parameter threshold programmable within said memory via said service/recalibration tool.

11. In a drive line including an internal combustion engine coupled by a torque converter to a number of additional drive line components, wherein said torque converter is operable in a lockup mode to couple the engine directly to said number of additional drive line components and otherwise operable in a torque converter mode, a method of protecting one or more of the number of additional drive train components from excessive engine inertial forces, the method comprising the steps of:

determining a first drive line operating parameter; comparing said first drive line operating parameter with at least one drive line parameter threshold; and forcing said torque converter to operate in said torque converter mode if said first drive line operating parameter is less than said at least one drive line parameter threshold.

12. The method of claim 11 wherein said at least one drive line parameter threshold is a negative threshold;

and wherein said forcing step includes forcing said torque converter to operate in said torque converter mode if said first drive line operating parameter is more negative than said at least one drive line parameter threshold.

13. The method of claim 12 wherein said first drive line operating parameter is drive line acceleration and said at least one drive line parameter threshold is an acceleration threshold.

14. The method of claim 12 wherein said first drive line operating parameter is an estimated engine torque and said at least one drive line parameter threshold is an engine torque threshold.

15. The method of claim 11 wherein said at least one drive line parameter threshold is a non-negative threshold.

16. The method of claim 15 wherein said first drive line operating parameter is drive line acceleration and said at least one drive line parameter threshold is an acceleration threshold.

17. The method of claim 15 wherein said first drive line operating parameter is an estimated engine torque and said at least one drive line parameter threshold is an engine torque threshold.

18. The method of claim 15 further including the steps of:
determining a second drive line operating parameter; and
comparing said second drive line operating parameter with at least another drive line parameter threshold;
wherein said forcing step includes forcing said torque converter to operate in said torque converter mode of said second drive line operating parameter is less than said at least another drive line parameter threshold.

19. The method of claim 18 wherein said first drive line operating parameter is drive line acceleration and said at least one drive line parameter threshold is an acceleration threshold;

and wherein said second drive line operating parameter is engine speed and said at least another drive line parameter threshold is an engine speed threshold.

20. The method of claim 18 wherein said first drive line operating parameter is an estimated engine torque and said at least one drive line parameter threshold is an engine torque threshold;

and wherein said second drive line operating parameter is engine speed and said at least another drive line parameter threshold is an engine speed threshold.

21. In a drive line including an internal combustion engine coupled by a torque converter to a number of additional drive line components, wherein said torque converter is operable in a lockup mode to couple the engine directly to said number of additional drive line components and otherwise operable in a torque converter mode, a method of protecting one or more of the number of additional drive train components from excessive engine inertial forces, the method comprising the steps of:

determining a first drive line operating parameter;
comparing said first drive line operating parameter with at least one drive line parameter threshold; and
modifying engine fueling if said torque converter is operating in said torque converter mode and said first drive line operating parameter is beyond said at least one drive line parameter threshold to bring said first drive line operating parameter within said at least one drive line parameter threshold.

22. The method of claim 21 wherein said at least one drive line parameter threshold is a negative threshold;

and wherein said modifying step includes reducing engine fueling if said first drive line operating parameter is more negative than said at least one drive line parameter threshold until said first drive line operating parameter becomes at least or more positive than said at least one drive line parameter threshold.

23. The method of claim 22 wherein said first drive line operating parameter is drive line acceleration and said at least one drive line parameter threshold is an acceleration threshold.

24. The method of claim 22 wherein said first drive line operating parameter is an estimated engine torque and said at least one drive line parameter threshold is an engine torque threshold.

25. The method of claim 21 wherein said at least one drive line parameter threshold is a non-negative threshold;

and wherein said modifying step includes increasing engine fueling if said first drive line operating parameter is greater than said at least one drive line parameter threshold until said first drive line operating parameter becomes less than or equal to said at least one drive line parameter threshold.

26. The method of claim 25 wherein said first drive line operating parameter is drive line acceleration and said at least one drive line parameter threshold is an acceleration threshold.

27. The method of claim 25 wherein said first drive line operating parameter is an estimated engine torque and said at least one drive line parameter threshold is an engine torque threshold.

28. The method of claim 21 wherein said at least one drive line parameter threshold is a non-negative threshold;

and wherein said modifying step includes reducing engine fueling if said first drive line operating parameter is greater than said at least one drive line parameter threshold until said first drive line operating parameter becomes less than or equal to said at least one drive line parameter threshold.

29. The method of claim 28 wherein said first drive line operating parameter is engine speed and said at least one drive line parameter threshold is a first engine speed threshold.

30. The method of claim 28 further including the step of comparing said first drive line operating parameter with at least another drive line parameter threshold;

wherein said modifying step includes reducing engine fueling if said first drive line operating parameter is greater than said at least one drive line parameter threshold and if said first drive line operating parameter is less than said at least another drive line parameter threshold until said first drive line operating parameter becomes less than or equal to said at least one drive line parameter threshold.

31. The method of claim 30 wherein said first drive line operating parameter is engine speed and said at least one drive line parameter threshold is a first engine speed threshold; and wherein said at least another drive line parameter threshold is a second engine speed threshold.

\* \* \* \* \*

UNITED STATES PATENT AND TRADEMARK OFFICE
CERTIFICATE OF CORRECTION

PATENT NO. : 6,508,739 B1
DATED : June 17, 2003
INVENTOR(S) : Larry Coldren

It is certified that error appears in the above-identified patent and that said Letters Patent is hereby corrected as shown below:

Column 10,
Line 39, after "signal" insert -- at --

Column 12,
Line 8, "generate" should read -- generates --
Line 16, "provide" should read -- provided --

Column 14,
Line 2, after "reflectors" insert -- is a sample-grating --

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,508,739 B1
DATED         : January 21, 2003
INVENTOR(S)   : Steven M. Bellinger It is certified that error appears in the above-identified patent and that said Letters Patent is hereby corrected as shown below:

This certificate supersedes Certificate of Correction issued September 30, 2003, the number was erroneously mentioned and should be vacated since no Certificate of Correction was granted.

Signed and Sealed this

Thirtieth Day of March, 2004

JON W. DUDAS
*Acting Director of the United States Patent and Trademark Office*